United States Patent
Huang et al.

(10) Patent No.: US 8,761,178 B2
(45) Date of Patent: Jun. 24, 2014

(54) METHOD FOR CREATING STREAM FORWARDING ENTRY, AND DATA COMMUNICATION DEVICE

(71) Applicant: Huawei Technologies Co., Ltd., Shenzhen (CN)

(72) Inventors: Zhigang Huang, Nanjing (CN); Feng Li, Nanjing (CN); Liyun Ou, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 12 days.

(21) Appl. No.: 13/655,990

(22) Filed: Oct. 19, 2012

(65) Prior Publication Data
US 2013/0044753 A1 Feb. 21, 2013

Related U.S. Application Data

(63) Continuation of application No. PCT/CN2011/072256, filed on Mar. 29, 2011.

(30) Foreign Application Priority Data

Apr. 22, 2010 (CN) .......................... 2010 1 0155663

(51) Int. Cl.
  *H04L 1/00* (2006.01)
  *H04L 12/26* (2006.01)
  *H04J 1/16* (2006.01)
  *H04J 3/14* (2006.01)
  *G08C 15/00* (2006.01)

(52) U.S. Cl.
  USPC ............ 370/392; 370/231; 370/252; 370/389

(58) Field of Classification Search
  USPC ................. 370/328–352, 389–392, 231–252; 709/229–241
  See application file for complete search history.

(56) References Cited

U.S. PATENT DOCUMENTS 6,754,662 B1 6/2004 Li
6,801,502 B1 10/2004 Rexford et al.
(Continued)

FOREIGN PATENT DOCUMENTS

CN 1697397 11/2005
CN 1953392 4/2007
(Continued)

OTHER PUBLICATIONS

Shaikh, A. et al., *Load-Sensitive Routing of Long-Lived IP Flows*, XP-000852200, pp. 215-226.
(Continued)

*Primary Examiner* — M. Phan
(74) *Attorney, Agent, or Firm* — Staas & Halsey LLP

(57) ABSTRACT

The present disclosure provide a method for creating a stream forwarding entry includes: receiving, by a data communication device, a packet; making statistics on the received packet to obtain a statistical value of a stream corresponding to the packet; judging whether the statistical value of the stream exceeds a preset threshold value; and if exceeds the preset threshold value, creating, by the data communication device, a stream forwarding entry for the stream corresponding to the packet, and performing stream forwarding for subsequent packets of the stream according to the stream forwarding entry. Through the present disclosure, the number of stream forwarding entries in a stream table is reduced, the required storage space is reduced, and the maintenance of the stream table is simplified; moreover, the data communication device is not vulnerable to attacks of denial of service and is highly secure.

16 Claims, 5 Drawing Sheets

(56) References Cited

U.S. PATENT DOCUMENTS

| | | | |
|---|---|---|---|
| 7,251,215 B1* | 7/2007 | Turner et al. | 370/231 |
| 7,321,565 B2* | 1/2008 | Todd et al. | 370/253 |
| 7,492,713 B1* | 2/2009 | Turner et al. | 370/231 |
| 7,653,005 B2* | 1/2010 | Zou et al. | 370/252 |
| 7,729,271 B2* | 6/2010 | Tsuchiya et al. | 370/252 |
| 7,869,352 B1* | 1/2011 | Turner et al. | 370/229 |
| 8,134,927 B2* | 3/2012 | Gamage et al. | 370/241 |
| 8,149,720 B2* | 4/2012 | Teng | 370/241 |
| 8,457,007 B2* | 6/2013 | Kondapalli | 370/252 |
| 2004/0085958 A1 | 5/2004 | Oman | |
| 2006/0239196 A1* | 10/2006 | Khanna et al. | 370/235 |
| 2007/0115850 A1 | 5/2007 | Tsuchiya et al. | |
| 2007/0171825 A1 | 7/2007 | Roberts et al. | |
| 2009/0097406 A1 | 4/2009 | Nilakantan et al. | |

FOREIGN PATENT DOCUMENTS

| | | |
|---|---|---|
| CN | 101127691 | 2/2008 |
| CN | 101136851 | 3/2008 |
| CN | 101321088 | 12/2008 |
| CN | 101635676 | 1/2010 |
| CN | 101800707 | 8/2010 |
| EP | 2482497 | 8/2012 |
| WO | 2009/043239 | 4/2009 |

OTHER PUBLICATIONS

Feldmann, A. et al., *Efficient Policies for Carrying Web Traffic Over Flow-Switched Networks*, IEEE/ACM Transactions on Networking, vol. 6, No. 6, Dec. 1998, pp. 673-685.

International Search Report, dated Jul. 7, 2011, in corresponding International Application No. PCT/CN2011/072256 (3 pp.).

Written Opinion of the International Searching Authority, dated Jul. 7, 2011, in corresponding International Application No. PCT/CN2011/072256 (3 pp.).

Extended European Search Report, dated Jan. 3, 2013, in corresponding European Application No. 11771529.2 (7 pp.).

European Office Action mailed Sep. 3, 2013 in corresponding European Patent Application No. 11771529.2-1856 (5 pages).

International Search Report of Corresponding PCT Application PCT/CN2011/072256 mailed Jul. 7, 2011.

* cited by examiner

METHOD FOR CREATING STREAM FORWARDING ENTRY, AND DATA COMMUNICATION DEVICE

CROSS-REFERENCE TO RELATED APPLICATION

This application is a continuation of International Application No. PCT/CN2011/072256, filed on Mar. 29, 2011, which claims priority to Chinese Patent Application No. 201010155663.2, filed with the Chinese Patent Office on Apr. 22, 2010, both of which are incorporated by reference herein in their entireties.

FIELD

The present disclosure relates to the field of communications technologies, and in particular, to a method for creating a stream forwarding entry, and a data communication device.

BACKGROUND

In data communication, packet processing of a data communication device generally includes packet forwarding and stream forwarding. Compared with the packet forwarding, a subsequent forwarding of the stream forwarding needs to look up a stream table only once, which reduces the number of times of table lookup. Further, the stream forwarding adopts exact match search, which reduces the forwarding delay. The stream table may include multiple stream forwarding entries, and the stream forwarding entry generally includes stream processing information of the data communication device.

Currently, in the data communication device, a stream forwarding entry is created in the following way. After receiving a packet, the data communication device judges whether the stream corresponding to the packet has a stream forwarding entry; if the stream has a stream forwarding entry, the data communication device forwards the packet according to the stream forwarding table entry; while if the stream has no stream forwarding entry, the data communication device creates a stream forwarding entry for the stream corresponding to the packet, and forwards the packet.

In the process of implementing the present disclosure, the inventor finds that in the prior art, stream forwarding entries need to be created for all packets that lack the corresponding stream forwarding entries, so the number of the stream forwarding entries in the stream table is huge, a large storage space is required, and the maintenance of the stream table is complicated; moreover, the data communication device is vulnerable to attacks of denial of service (DOS, Denial of Service) and is poorly secure.

SUMMARY

Embodiments of the present disclosure provide a method for creating a stream forwarding entry and a data communication device, in which statistics is made on a received packet to obtain a statistical value of a stream corresponding to the packet, and when the statistical value of the stream corresponding to the packet exceeds a preset threshold value, a stream forwarding entry is created for the stream corresponding to the packet. In this way, the number of stream forwarding entries in a stream table is reduced, the required storage space is reduced, and the maintenance of the stream table is simplified; moreover, the data communication device is not vulnerable to attacks of denial of service and is highly secure.

An embodiment of the present disclosure provides a method for creating a stream forwarding entry, and the method includes: receiving, by a data communication device, a packet; making statistics on the received packet to obtain a statistical value of a stream corresponding to the packet, where the statistical value includes number of packets or number of bytes; judging whether the statistical value of the stream exceeds a preset threshold value; and if a judging result is that the statistical value exceeds the preset threshold value, creating, by the data communication device, a stream forwarding entry for the stream corresponding to the packet, and performing stream forwarding for subsequent packets of the stream corresponding to the packet according to the stream forwarding entry.

Further, an embodiment of the present disclosure provides a data communication device, and the data communication device includes:

a packet receiving unit, configured to receive a packet;

a statistical unit, configured to make statistics on the packet received by the packet receiving unit to obtain a statistical value of a stream corresponding to the packet, where the statistical value includes number of packets or number of bytes;

a first judging unit, configured to judge whether the statistical value of the stream corresponding to the packet exceeds a preset threshold value;

an entry creating unit, configured to create a stream forwarding entry for the stream corresponding to the packet, if a judging result obtained by the first judging unit is that the statistical value exceeds the preset threshold value; and a first forwarding unit, configured to perform stream forwarding for subsequent packets of the stream corresponding to the packet according to the stream forwarding entry created by the entry creating unit, if the judging result obtained by the first judging unit is that the statistical value exceeds the preset threshold value.

The embodiments of the present disclosure bring the following benefits. Statistics is made on a received packet to obtain a statistical value of a stream corresponding to the packet, and when the statistical value of the stream corresponding to the packet exceeds a preset threshold value, a stream forwarding entry is created for the stream corresponding to the packet. In this way, the number of stream forwarding entries in a stream table is reduced, the required storage space is reduced, and the maintenance of the stream table is simplified; moreover, the data communication device is not vulnerable to attacks of denial of service and is highly secure.

BRIEF DESCRIPTION OF THE DRAWINGS

The accompanying drawings outlined below are intended to make the present disclosure more comprehensible, and are part of this application but shall not be construed as a limitation on the present disclosure.

DETAILED DESCRIPTION OF THE EMBODIMENTS

To make the objectives, solutions and merits of the present disclosure clearer and more comprehensible, the following describes the embodiments of the present disclosure in more detail with reference to the accompanying drawings. The exemplary embodiments of the present disclosure and the description thereof are illustrative in nature, and shall not be construed as limitation on the present disclosure.

Embodiment 1

Figure 1:
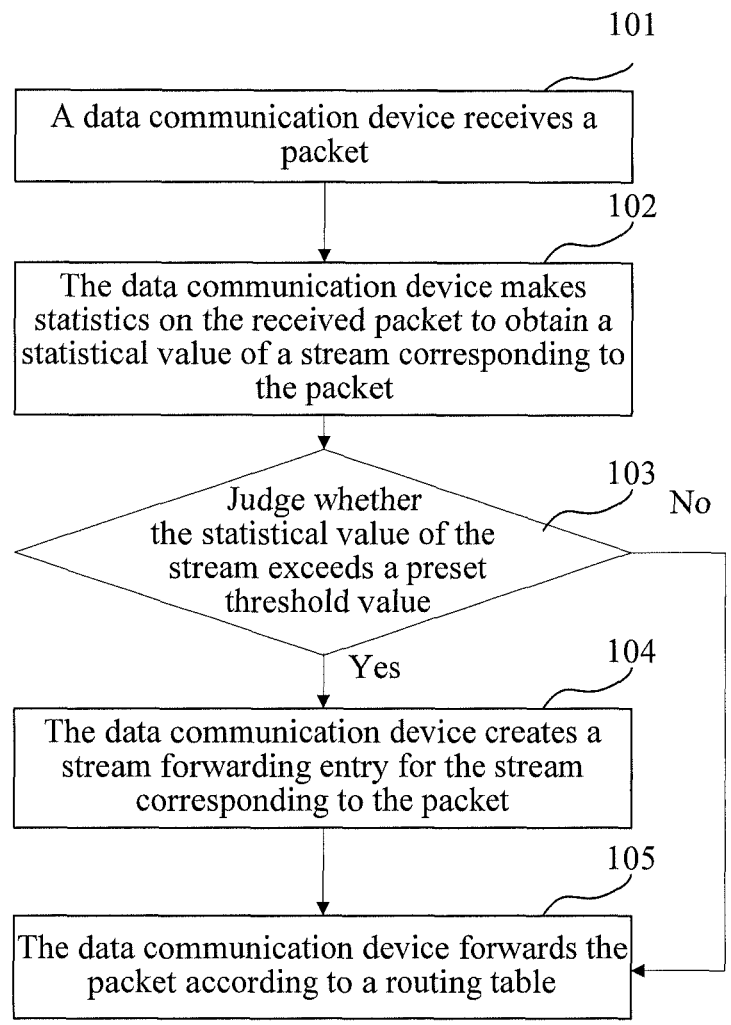
FIG. 1 is a flowchart of a method for creating a stream forwarding entry according to Embodiment 1 of the present disclosure.

An embodiment of the present disclosure provides a method for creating a stream forwarding entry. As shown in FIG. 1, the method includes:

Step 101: A data communication device receives a packet.

Step 102: The data communication device makes statistics on the received packet to obtain a statistical value of a stream corresponding to the packet, where the statistical value includes number of packets or number of bytes.

Step 103: The data communication device judges whether the statistical value of the stream exceeds a preset threshold value. If a judging result is that the statistical value exceeds the preset threshold value, step 104 is performed; while if the judging result is that the statistical value does not exceed the preset threshold value, step 105 is performed.

Step 104: The data communication device creates a stream forwarding entry for the stream corresponding to the packet, and performs stream forwarding for subsequent packets of the stream corresponding to the packet according to the stream forwarding entry.

Step 105: The data communication device forwards the packet according to a routing table.

In this embodiment, the data communication device may be a router or switch, or other types of data communication devices.

In this embodiment, the packet may be an IPv4 packet or IPv6 packet; after receiving the packet, the data communication device makes statistics on the received packet according to tuple information such as a source IP address and a destination IP address of the packet to obtain a statistical value of a stream corresponding to the packet, where the statistical value includes number of packets or number of bytes.

In this embodiment, the data communication device may preset a threshold value of the number of packets corresponding to the stream, or a threshold value of the number of bytes corresponding to the stream. In this way, the data communication device can judge whether the statistical value of the stream corresponding to the packet exceeds the preset threshold value. If a judging result is that the statistical value exceeds the preset threshold value, the data communication device creates a stream forwarding entry for the stream corresponding to the packet.

For example, the data communication device may preset the threshold value of the number of packets corresponding to the stream to 5. In the data forwarding process, after receiving an IPv4 packet, the data communication device may determine the stream corresponding to the packet according to 5-tuple information of the packet. The 5-tuple information includes: a source IP address, a destination IP address, a protocol number, a source port number, and a destination port number. If statistics shows that the packet is the 6th packet of the stream corresponding to the packet, the statistical value of the stream corresponding to the packet is 6; the statistical value 6 exceeds the preset threshold value 5, and therefore, the data communication device creates a stream forwarding entry for the stream corresponding to the packet.

Alternatively, the data communication device may preset the threshold value of the number of bytes corresponding to the stream to 1000. In the data forwarding process, after receiving an IPv6 packet, the data communication device may determine a stream corresponding to the packet according to 3-tuple information of the packet. The 3-tuple information includes: a source IP address, a destination IP address, and a stream label. If statistics shows that a total of 998 bytes of the stream corresponding to the packet are received before the packet is received, the packet has 40 bytes, and a total of 1038 bytes of the stream corresponding to the packet are received after the packet is received, the statistical value of the stream corresponding to the packet is 1038; the statistical value 1038 exceeds the preset threshold value 1000, and therefore, the data communication device creates a stream forwarding entry for the stream corresponding to the packet.

The foregoing instance is illustrative in nature, but shall not be construed as a limitation. The detailed implementation mode may be determined according to actual conditions.

In this embodiment, the foregoing steps can largely reduce the number of stream forwarding entries in a stream table and the required storage space, and simplify the maintenance of the stream table. In the following description, it is assumed that an average size of a packet is 500 bytes, each stream includes 20 packets on average, and a port is 10 Gbps. In this case, a stream refresh rate of a port is 10 G/500/8/20=130 K/s. Supposing that the aging time is 15 seconds per period, approximately 2M stream forwarding entries are required in the prior art. If the foregoing solution of the present disclosure is applied, the data communication device does not create a stream forwarding entry for the stream corresponding to the packet until the statistical value of the stream corresponding to the packet exceeds the preset threshold value, and therefore, the stream forwarding entries in the stream table decrease to 5% or less.

Besides, through the foregoing technical solution, the data communication device is not vulnerable to attacks of denial of service, and is highly secure. It is assumed that the attack is a transmission control protocol synchronous flood (TCP SYN flood, Transmission Control Protocol SYN flood). This attack sends only a TCP SYN packet, and one stream has only one packet. In the prior art, a corresponding stream forwarding entry is created for each TCP SYN packet sent by the TCP SYN flood attacker, which leads to deficiency of the storage space of the stream table, and frustrates normal stream forwarding; while through the foregoing solution of the present disclosure, the data communication device does not create a stream forwarding entry for the stream corresponding to the packet until the statistical value of the stream corresponding to the packet exceeds the preset threshold value, and does not create a corresponding stream forwarding entry for the TCP SYN packet sent by the TCP SYN flood attacker.

As revealed in the foregoing embodiment, statistics is made on a received packet to obtain a statistical value of a stream corresponding to the packet, and when the statistical value of the stream corresponding to the packet exceeds a preset threshold value, a stream forwarding entry is created for the stream corresponding to the packet. In this way, the number of stream forwarding entries in a stream table is reduced, the required storage space is reduced, and the maintenance of the stream table is simplified; moreover, the data communication device is not vulnerable to attacks of denial of service and is highly secure.

Embodiment 2

Figure 2:
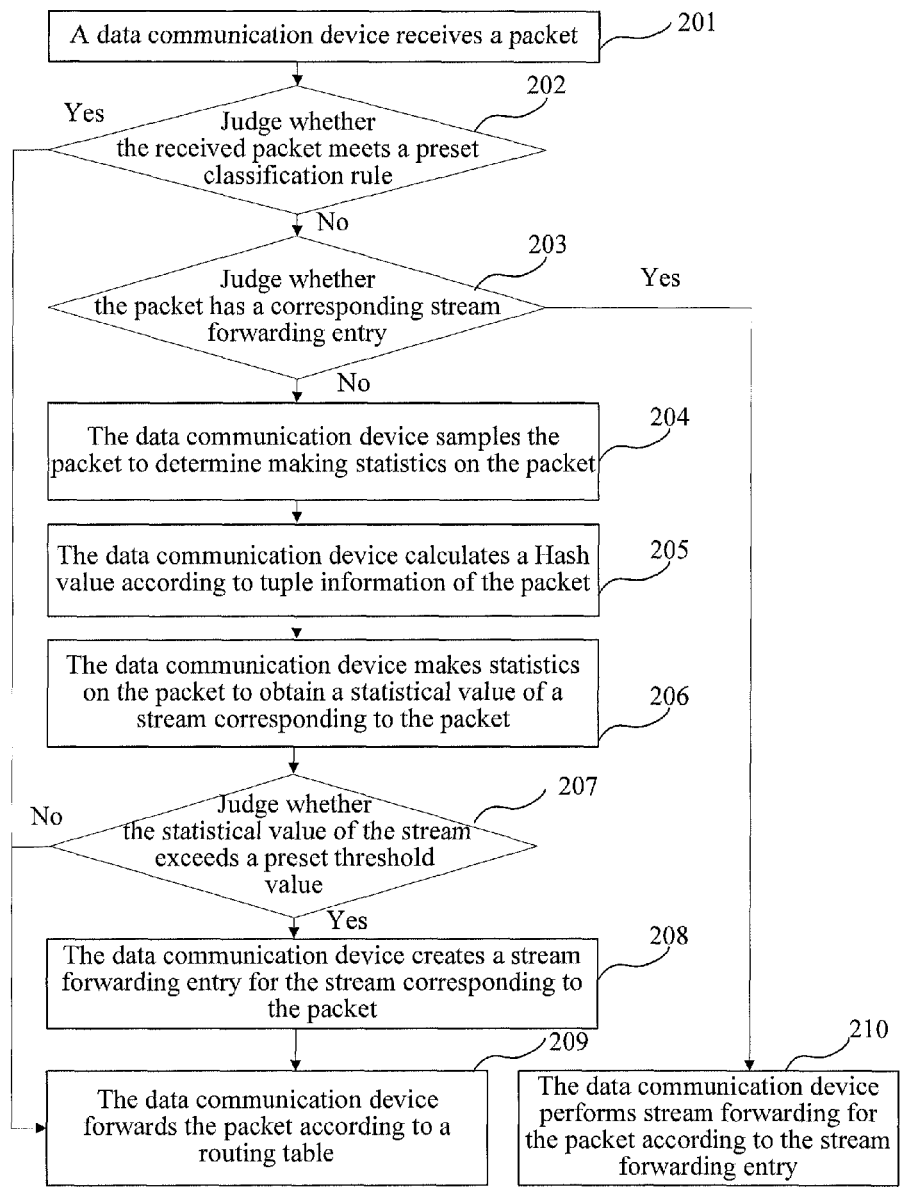
FIG. 2 is a stream forwarding flowchart according to Embodiment 2 of the present disclosure.

An embodiment of the present disclosure provides a method for creating a stream forwarding entry. As shown in FIG. 2, the method includes:

Step 201: A data communication device receives a packet.

Step 202: The data communication device judges whether the received packet meets a preset classification rule. If a judging result is that the received packet does not meet the preset classification rule, step 203 is performed; while if the judging result is that the received packet meets the preset classification rule, step 209 is performed.

In this embodiment, in a protocol interaction process, some packets are few in number and need no stream processing, and the data communication device may preset a classification rule for packets. For example, the interaction process of domain name system (DNS, Domain Name System) protocol packets or Internet control message protocol (ICMP, Internet Control Message Protocol) packets is simple, one stream generally has only one packet, and the packets need no stream processing. Therefore, the preset classification rule may be: whether the packet is a DNS protocol packet, or whether the packet is an ICMP packet. However, the classification rule is not limited to that, and may be determined according to actual conditions.

In this embodiment, the data communication device may forward packets according to a routing table directly when the packet meets the classification rule. In this way, it is not necessary to perform stream forwarding processing for the packets that are few in number and need no stream forwarding, and the performance overhead of the subsequent stream forwarding processing is reduced.

Step 203: The data communication device judges whether the packet has a corresponding stream forwarding entry. If a judging result is that no corresponding stream forwarding entry exists, step 204 is performed; otherwise, step 210 is performed.

In this embodiment, exact match search can be performed in a stream table according to fields in the packet, for example, a 5-tuple of an IPv4 packet. The search process can be based on the prior art, and is not repeated here any further.

Step 204: The data communication device samples the packet to determine making statistics on the packet.

In this embodiment, the data communication device may determine whether to make statistics on the packets by means of sampling. The sampling may be based on bytes, that is, based on the bytes that pass through the data communication device; or the sampling may be based on packets, that is, based on the packets that pass through the data communication device.

For example, if a packet sampling rate is 20:1, when a packet is the 20th packet that passes through the data communication device, the data communication device determines to make statistics on the packet; or, if a byte sampling rate is 10000:1, when a byte is the 10000th byte that passes through the data communication device, the data communication device determines to make statistics on the packet corresponding to the byte. However, the implementation means is not limited to that, and may be determined according to actual conditions. For example, a random number may be used in sampling.

In this embodiment, the data communication device determines whether to make statistics on the packet by means such as sampling, which relieves the performance pressure of the data communication device, and avoids the problem that the data communication device can hardly implement high-performance statistics due to the limit of the memory access bottleneck.

Besides, this step is not limited to be performed after step 203, and may be performed after step 201 or step 202, and the detailed implementation mode may be determined according to the actual conditions.

Step 205: The data communication device calculates a Hash value according to tuple information of the packet. The tuple information includes a source IP address, a destination IP address, a protocol number, a source port, and a destination port, or includes a source IP address, a destination IP address, and a stream label.

In this embodiment, the data communication device may extract 5-tuple information of an IPv4 packet, where the tuple information includes a source IP address, a destination IP address, a protocol number, a source port, a destination port; or, the data communication device may extract 3-tuple information of an IPv6 packet, where the tuple information includes a source IP address, a destination IP address, and a stream label; and then the data communication device calculates a Hash (Hash) value so that statistics can be made according to the Hash value. The Hash algorithm may be based on the prior art, such as cyclic redundancy check (CRC, Cyclic Redundancy Check) and exclusive-or (XOR) algorithm.

Besides, this step is not limited to be performed after step 204, and may be performed after step 201, step 202, or step 203, and the detailed implementation mode may be determined according to the actual conditions.

Step 206: The data communication device makes statistics on the packet to obtain a statistical value of a stream corresponding to the packet, where the statistical value includes number of packets or number of bytes.

In this embodiment, the data communication device may make statistics on the packet according to the Hash value obtained in step 205, so as to obtain a statistical value of a stream corresponding to the packet.

For example, the Hash value may be used as an address of a memory, and the data communication device reads the memory address to make statistics on the packet, and may write the statistical result into the memory address. In this way, it is convenient to make statistics.

Step 207: The data communication device judges whether the statistical value of the stream exceeds a preset threshold value. If a judging result is that the statistical value exceeds the preset threshold value, step 208 is performed; otherwise, step 209 is performed.

Step 208: The data communication device creates a stream forwarding entry for the stream corresponding to the packet, so that the data communication device performs stream forwarding for subsequent packets of the stream corresponding to the packet according to the stream forwarding entry.

Step 209: The data communication device forwards the packet according to a routing table.

In this embodiment, the data communication device forwarding the packet according to the routing table may include: looking up the routing table to determine next hop information, modifying the packet, and sending the packet to an egress port. The foregoing process may be based on the prior art, and is not detailed here any further.

Step 210: The data communication device performs stream forwarding for a packet according to the stream forwarding entry.

In this embodiment, the data communication device performing stream forwarding for a packet according to the stream forwarding entry may include: modifying the packet, and sending the packet to the egress port. The stream forwarding process may be based on the prior art, and is not detailed here any further.

As revealed in the foregoing embodiment, statistics is made on a received packet to obtain a statistical value of a stream corresponding to the packet, and when the statistical value of the stream corresponding to the packet exceeds a preset threshold value, a stream forwarding entry is created for the stream corresponding to the packet. In this way, the number of stream forwarding entries in a stream table is reduced, the required storage space is reduced, and the maintenance of the stream table is simplified; the packet compliant with the classification rule is forwarded directly, which provides a high performance-to-cost ratio; moreover, the data communication device is not vulnerable to attacks of denial of service and is highly secure.

Embodiment 3

Figure 3:
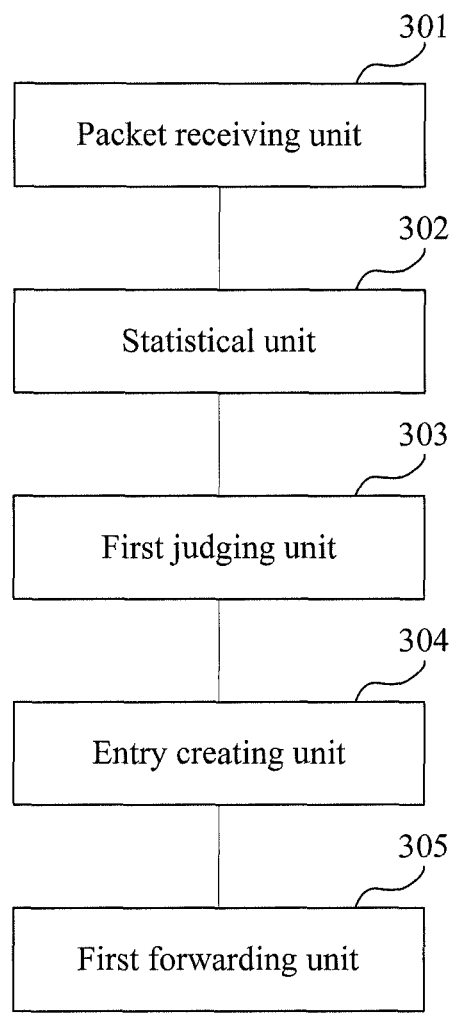
FIG. 3 is a composition diagram of a data communication device according to Embodiment 3 of the present disclosure.

An embodiment of the present disclosure provides a data communication device. As shown in FIG. 3, the data communication device includes: a packet receiving unit 301, a statistical unit 302, a first judging unit 303, an entry creating unit 304, and a first forwarding unit 305.

The packet receiving unit 301 is configured to receive a packet.

The statistical unit 302 is configured to make statistics on the packet received by the packet receiving unit 301 to obtain a statistical value of a stream corresponding to the packet, where the statistical value includes number of packets or number of bytes.

The first judging unit 303 is configured to judge whether the statistical value of the stream corresponding to the packet exceeds a preset threshold value.

The entry creating unit 304 is configured to create a stream forwarding entry for the stream corresponding to the packet, if a judging result obtained by the first judging unit 303 is that the statistical value exceeds the preset threshold value.

The first forwarding unit 305 is configured to perform stream forwarding for subsequent packets of the stream corresponding to the packet according to the stream forwarding entry created by the entry creating unit 304, if the judging result obtained by the first judging unit 303 is that the statistical value exceeds the preset threshold value.

In this embodiment, the data communication device may be a router or switch, or other types of data communication devices.

In this embodiment, the working procedure of the data communication device may be the same as that described in Embodiment 1, and is not repeated here any further.

As revealed in the foregoing embodiment, statistics is made on a received packet to obtain a statistical value of a stream corresponding to the packet, and when the statistical value of the stream corresponding to the packet exceeds a preset threshold value, a stream forwarding entry is created for the stream corresponding to the packet. In this way, the number of stream forwarding entries in a stream table is reduced, the required storage space is reduced, and the maintenance of the stream table is simplified; moreover, the data communication device is not vulnerable to attacks of denial of service and is highly secure.

Embodiment 4

Figure 4:
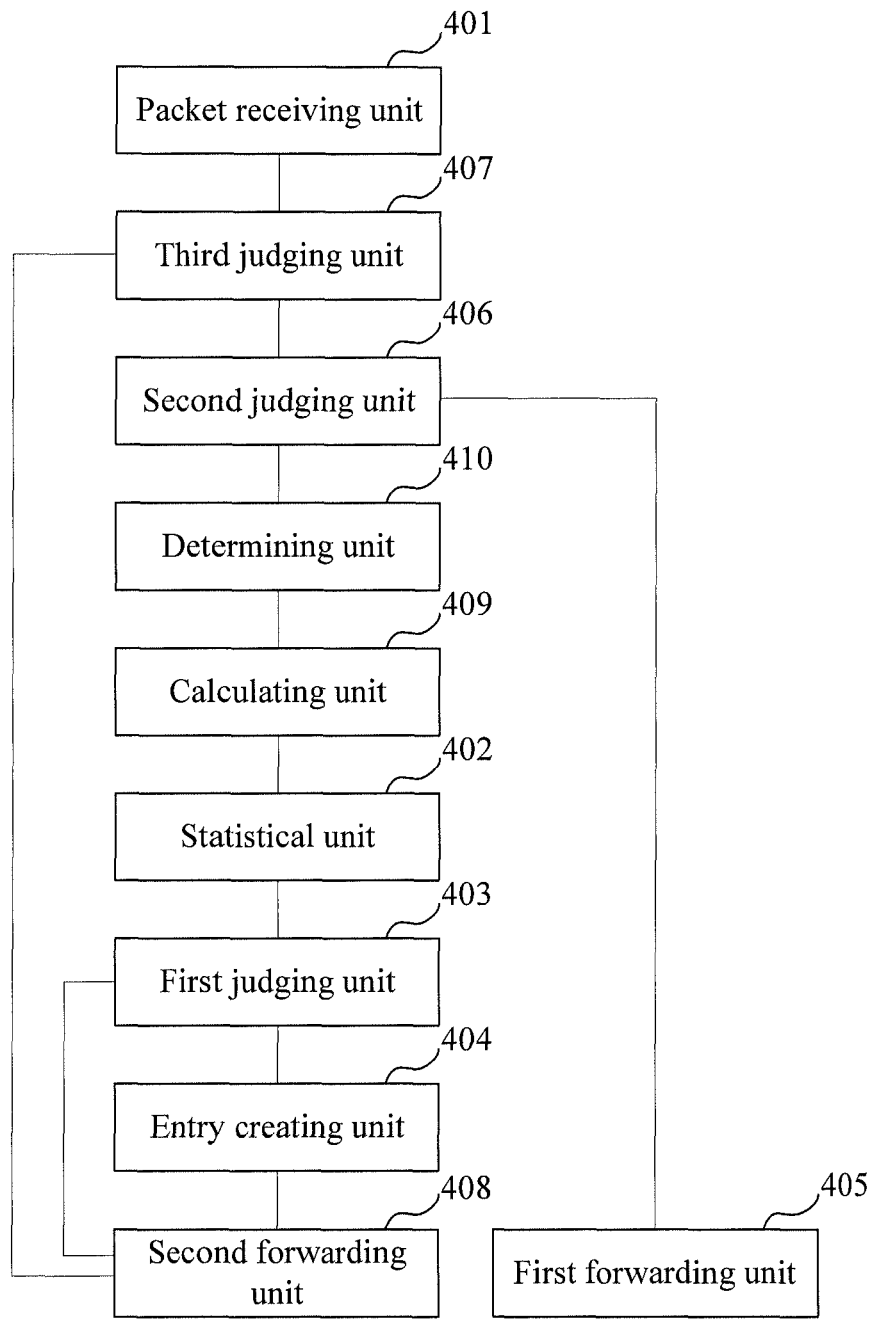
FIG. 4 is a composition diagram of a data communication device according to Embodiment 4 of the present disclosure.

An embodiment of the present disclosure provides a data communication device. As shown in FIG. 4, the data communication device includes: a packet receiving unit 401, a statistical unit 402, a first judging unit 403, an entry creating unit 404, and a first forwarding unit 405. The units are the same as those described in Embodiment 3, and are not repeated here any further.

As shown in FIG. 4, the data communication device may further include a second judging unit 406.

The second judging unit 406 is configured to judge whether the packet received by the packet receiving unit 401 has a corresponding stream forwarding entry.

The first forwarding unit 405 is further configured to perform stream forwarding for the packet according to the stream forwarding entry, if a judging result obtained by the second judging unit 406 is that the corresponding stream forwarding entry exists.

The statistical unit 402 is further configured to make statistics on the packet to obtain a statistical value of the stream corresponding to the packet, if the judging result obtained by the second judging unit 406 is that the corresponding stream forwarding entry does not exist.

As shown in FIG. 4, the data communication device may further include a third judging unit 407 and a second forwarding unit 408.

The third judging unit 407 is configured to judge whether the packet received by the packet receiving unit 401 meets a preset classification rule.

The second forwarding unit 408 is configured to forward the packet according to a routing table, if a judging result obtained by the third judging unit 407 is that the packet meets the preset classification rule.

The second judging unit 406 is further configured to judge whether the packet has a corresponding stream forwarding entry, if the judging result obtained by the third judging unit 407 is that the packet does not meet the preset classification rule.

As shown in FIG. 4, the data communication device may further include a calculating unit 409.

The calculating unit 409 is configured to calculate a Hash value according to tuple information of the packet, where the tuple information includes a source IP address, a destination IP address, a protocol number, a source port, and a destination port, or includes a source IP address, a destination IP address, and a stream label.

The statistical unit 402 is further configured to make statistics on the packet according to the Hash value so as to obtain a statistical value of the stream corresponding to the packet.

As shown in FIG. 4, the data communication device may further include a determining unit 410.

The determining unit 410 is configured to sample the packet to determine making statistics on the packet.

The statistical unit 402 is further configured to make statistics on the packet to obtain a statistical value of the stream corresponding to the packet, if the determining unit 410 determines to make statistics on the packet.

In this embodiment, the working procedure of the data communication device may be the same as that described in Embodiment 2, and is not repeated here any further.

As revealed in the foregoing embodiment, statistics is made on a received packet to obtain a statistical value of a stream corresponding to the packet, and when the statistical value of the stream corresponding to the packet exceeds a preset threshold value, a stream forwarding entry is created for the stream corresponding to the packet. In this way, the number of stream forwarding entries in a stream table is reduced, the required storage space is reduced, and the maintenance of the stream table is simplified; the packet compliant with the classification rule is forwarded directly, which provides a high performance-to-cost ratio; moreover, the data communication device is not vulnerable to attacks of denial of service and is highly secure.

Embodiment 5

An embodiment of the present disclosure provides a data communication device. The following describes the data communication device in more detail through an instance with reference to FIG. 5 on the basis of Embodiment 4.

Figure 5:
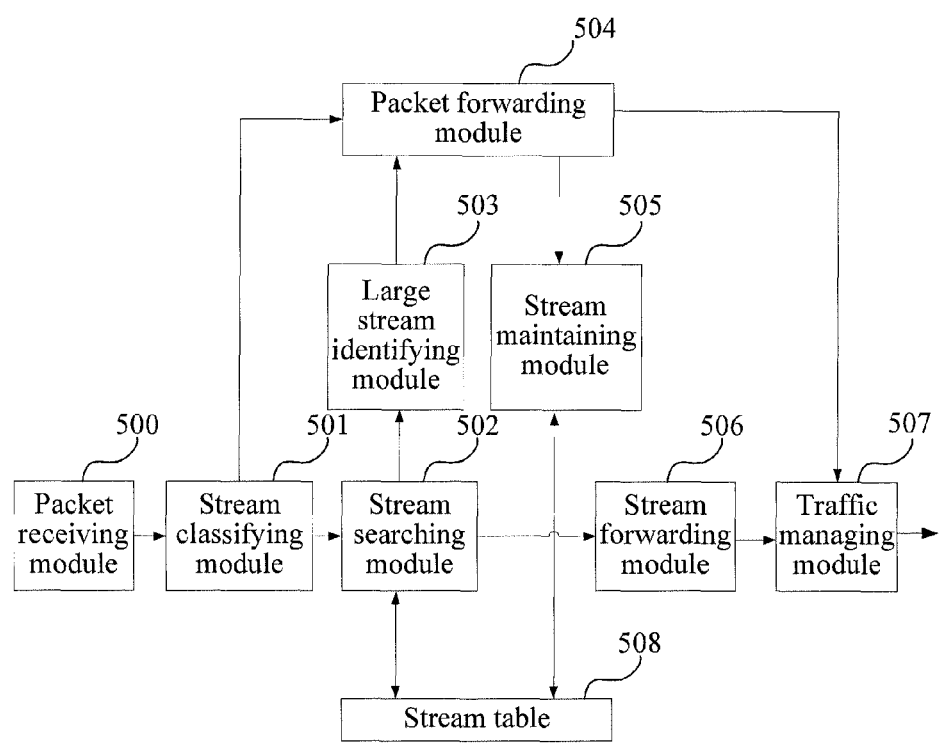
FIG. 5 is an instance diagram of a data communication device according to Embodiment 5 of the present disclosure.

As shown in FIG. 5, the data communication device may include a packet receiving module 500, a stream classifying module 501, a stream searching module 502, a large stream identifying module 503, a packet forwarding module 504, a stream maintaining module 505, and a stream forwarding module 506. The foregoing modules may be implemented through the units in Embodiment 4.

The packet receiving module 500 may be implemented through the packet receiving unit 401; the stream classifying module 501 may be implemented through the third judging unit 407; the stream searching module 502 may be implemented through the second judging unit 406; the large stream identifying module 503 is configured to judge whether the stream corresponding to the packet is a large stream, where the large stream may be a stream with relatively more packets or bytes, and the large stream identifying module 503 may be implemented through the statistical unit 402, the first judging unit 403, the calculating unit 409, and the determining unit 410; the packet forwarding module 504 may be implemented through the second forwarding unit 408; the stream maintaining module 505 may be implemented through the entry creating unit 404; and the stream forwarding module 506 may be implemented through the first forwarding unit 405.

Besides, as shown in FIG. 5, the data communication device may further include a traffic managing module 507 and a stream table 508.

In this embodiment, after receiving a packet, the packet receiving module 500 sends the received packet to the stream classifying module 501; the stream classifying module 501 is configured to judge whether the received packet meets a preset classification rule, and if the packet meets the classification rule, for example, the packet is a DNS packet, send the packet to the packet forwarding module 504; and the packet forwarding module 504 forwards the packet according to a routing table. The step of judging whether the packet meets the classification rule may be the same as step 202 in Embodiment 2, and is not repeated here any further.

If the packet does not meet the classification rule, the stream classifying module 501 sends the packet to the stream searching module 502. After receiving the packet, the stream searching module 502 judges whether a stream forwarding entry corresponding to the packet exists in the stream table 508, and if the corresponding stream forwarding entry exists, sends the packet to the stream forwarding module 506, whereupon the stream forwarding module 506 performs stream forwarding according to the corresponding stream forwarding entry in the stream table 508; while if no corresponding stream forwarding entry exists, sends the packet to the large stream identifying module 503.

After receiving the packet sent by the stream searching module 502, the large stream identifying module 503 judges whether the stream corresponding to the packet is a large stream. The large stream may be a stream with relatively more packets or bytes. For example, the stream with more than 5 packets is a large stream. The judging manner may be the same as that in step 102 and step 103 in Embodiment 1, or the same as that in steps 204 to 207 in Embodiment 2, and is not repeated here any further. Moreover, the large stream identifying module 503 sends the packet to the packet forwarding module 504 for forwarding. If the stream is a large stream, the stream maintaining module 505 creates a stream forwarding entry of the stream corresponding to the packet in the stream table 508.

In this embodiment, after the packet is processed by the packet forwarding module 504 or the stream forwarding module 506, the traffic managing module 507 may perform traffic shaping and queue scheduling for the packet so as to provide better quality of service (QoS, Quality of Service) assurance.

In this embodiment, the packet may be an IPv4 packet or IPv6 packet.

In this embodiment, each of the foregoing modules is not limited to be implemented on a specific processor or apparatus, and may be implemented on an ordinary central processing unit (CPU), network processor (NP, Network Processor), application specific integrated circuit (ASIC, Application Specific Integrated Circuit), or field programmable gate array (FPGA, Field Programmable Gate Array).

As revealed in the foregoing embodiment, statistics is made on a received packet to obtain a statistical value of a stream corresponding to the packet, and when the statistical value of the stream corresponding to the packet exceeds a preset threshold value, a stream forwarding entry is created for the stream corresponding to the packet. In this way, the number of stream forwarding entries in a stream table is reduced, the required storage space is reduced, and the maintenance of the stream table is simplified; the packet compliant with the classification rule is forwarded directly, which provides a high performance-to-cost ratio; moreover, the data communication device is not vulnerable to attacks of denial of service and is highly secure.

Persons skilled in the art will further appreciate that the various units and algorithm steps described in connection with the embodiments disclosed herein can be implemented as electronic hardware, computer software, or a combination of both. To illustrate the interchangeability of hardware and software clearly, various illustrative components and steps have been described above generally in terms of their functionality. Regarding whether such functionality is implemented as hardware or software, it depends upon the particular application of the technical solution and constraint conditions of design. Persons skilled in the art may implement the described functionality in varying ways for each particular application, but such implementations should not be interpreted as causing a departure from the scope of the present disclosure.

The steps of a method or algorithm described in connection with the embodiments disclosed herein may be embodied directly in hardware, in a software module executed by a processor, or in a combination of the two. The software module may reside in a random access memory (RAM), a memory, a read-only memory (ROM), an electrically programmable ROM, an electrically erasable programmable ROM, a register, a hard disk, a removable disk, a CD-ROM, or any other form of a storage medium well known in the art.

The foregoing text describes the objectives, solutions and benefits of the embodiments of the present disclosure in detail. Although the present disclosure is described in detail with reference to some embodiments, those embodiments are not intended to limit the present disclosure. Any modification, equivalent replacement, or improvement made to the embodiments of the present disclosure without departing from the spirit and principle of the present disclosure shall fall into the protection scope of the present disclosure.

What is claimed is:

1. A method for creating a stream forwarding entry, comprising:
   receiving, by a data communication device, a packet;
   making statistics, by the data communication device, on the received packet to obtain a statistical value of a stream corresponding to the packet, wherein the statistical value comprises number of packets or number of bytes;
   judging whether the statistical value of the stream corresponding to the packet exceeds a preset threshold value; and
   if a judging result is that the statistical value exceeds the preset threshold value, creating, by the data communication device, a stream forwarding entry for the stream corresponding to the packet, and performing stream forwarding for subsequent packets of the stream corresponding to the packet according to the stream forwarding entry;
   wherein before the making statistics on the received packet to obtain the statistical value of the stream corresponding to the packet, the method further comprises:
      judging whether the packet has a corresponding stream forwarding entry;
      making statistics on the packet to obtain the statistical value of the stream corresponding to the packet, if a judging result is that no corresponding stream forwarding entry exists; and
      performing stream forwarding for the packet according to the stream forwarding entry, if the judging result is that the corresponding stream forwarding entry exists.

2. The method according to claim 1, wherein before the judging whether the packet has the corresponding stream forwarding entry, the method comprises:
   judging whether the packet meets a preset classification rule;
   judging whether the packet has the corresponding stream forwarding entry, if a judging result is that the packet does not meet the preset classification rule; and
   forwarding the packet according to a routing table, if the judging result is that the packet meets the preset classification rule.

3. The method according to claim 2, wherein before the making statistics on the received packet to obtain the statistical value of the stream corresponding to the packet, the method further comprises:
   calculating a Hash value according to tuple information of the packet, wherein the tuple information comprises a source IP address, a destination IP address, a protocol number, a source port, and a destination port, or comprises a source IP address, a destination IP address, and a stream label; and
   the making statistics on the packet specifically comprises: making statistics on the packet according to the Hash value to obtain the statistical value of the stream corresponding to the packet.

4. The method according to claim 2, wherein before the making statistics on the received packet to obtain the statistical value of the stream corresponding to the packet, the method further comprises:
   sampling the packet to determine making statistics on the packet.

5. The method according to claim 1, wherein before the making statistics on the received packet to obtain the statistical value of the stream corresponding to the packet, the method further comprises:
   calculating a Hash value according to tuple information of the packet, wherein the tuple information comprises a source IP address, a destination IP address, a protocol number, a source port, and a destination port, or comprises a source IP address, a destination IP address, and a stream label; and
   the making statistics on the packet specifically comprises: making statistics on the packet according to the Hash value to obtain the statistical value of the stream corresponding to the packet.

6. The method according to claim 1, wherein before the making statistics on the received packet to obtain the statistical value of the stream corresponding to the packet, the method further comprises:
   sampling the packet to determine making statistics on the packet.

7. The method according to claim 1, wherein before the making statistics on the received packet to obtain the statistical value of the stream corresponding to the packet, the method further comprises:
   calculating a Hash value according to tuple information of the packet, wherein the tuple information comprises a source IP address, a destination IP address, a protocol number, a source port, and a destination port, or comprises a source IP address, a destination IP address, and a stream label; and
   the making statistics on the packet specifically comprises: making statistics on the packet according to the Hash value to obtain the statistical value of the stream corresponding to the packet.

8. The method according to claim 1, wherein before the making statistics on the received packet to obtain the statistical value of the stream corresponding to the packet, the method further comprises:
   sampling the packet to determine making statistics on the packet.

9. A data communication device, comprising:
   a packet receiving unit, configured to receive a packet;
   a statistical unit, configured to make statistics on the packet received by the packet receiving unit to obtain a statistical value of a stream corresponding to the packet, wherein the statistical value comprises number of packets or number of bytes;
   a first judging unit, configured to judge whether the statistical value of the stream corresponding to the packet exceeds a preset threshold value;
   an entry creating unit, configured to create a stream forwarding entry for the stream corresponding to the packet, if a judging result obtained by the first judging unit is that the statistical value exceeds the preset threshold value; and
   a first forwarding unit, configured to perform stream forwarding for subsequent packets of the stream corresponding to the packet according to the stream forwarding entry created by the entry creating unit, if the judging result obtained by the first judging unit is that the statistical value exceeds the preset threshold value;
   a second judging unit, configured to judge whether the packet received by the packet receiving unit has a corresponding ream forwarding entry, wherein
   the first forwarding unit is further configured to perform stream forwarding for the packet according to the stream forwarding judging in result obtained by the second judging unit is that the corresponding stream forwarding entry exists; and
   the statistical unit is further configured to make statistics on the packet to obtain a statistical value of the stream corresponding to the packet, if the judging result obtained by the second judging unit is that the corresponding stream forwarding entry does not exist.

10. The data communication device according to claim 9, comprising:
   a third judging unit, configured to judge whether the packet received by the packet receiving unit meets a preset classification rule; and
   a second forwarding unit, configured to forward the packet according to a routing table, if a judging result obtained by the third judging unit is that the packet meets the preset classification rule, wherein
   the second judging unit is further configured to judge whether the packet has a corresponding stream forwarding entry, if the judging result obtained by the third judging unit is that the packet does not meet the preset classification rule.

11. The data communication device according to claim 10, comprising:
   a calculating unit, configured to calculate a Hash value according to tuple information of the packet, wherein the tuple information comprises a source IP address, a destination IP address, a protocol number, a source port, and a destination port, or comprises a source IP address, a destination IP address, and a stream label, wherein
   the statistical unit is further configured to make statistics on the packet according to the Hash value so as to obtain a statistical value of the stream corresponding to the packet.

12. The data communication device according to claim 10, comprising:
   a determining unit, configured to sample the packet to determine making statistics on the packet, wherein
   the statistical unit is further configured to make statistics on the packet to obtain a statistical value of the stream corresponding to the packet, if the determining unit determines to make statistics on the packet.

13. The data communication device according to claim 9, comprising:
   a calculating unit, configured to calculate a Hash value according to tuple information of the packet, wherein the tuple information comprises a source IP address, a destination IP address, a protocol number, a source port, and a destination port, or comprises a source IP address, a destination IP address, and a stream label, wherein
   the statistical unit is further configured to make statistics on the packet according to the Hash value so as to obtain a statistical value of the stream corresponding to the packet.

14. The data communication device according to claim 9, comprising:
   a determining unit, configured to sample the packet to determine making statistics on the packet, wherein
   the statistical unit is further configured to make statistics on the packet to obtain a statistical value of the stream corresponding to the packet, if the determining unit determines to make statistics on the packet.

15. The data communication device according to claim 9, comprising:
   a calculating unit, configured to calculate a Hash value according to tuple information of the packet, wherein the tuple information comprises a source IP address, a destination IP address, a protocol number, a source port, and a destination port, or comprises a source IP address, a destination IP address, and a stream label, wherein
   the statistical unit is further configured to make statistics on the packet according to the Hash value so as to obtain a statistical value of the stream corresponding to the packet.

16. The data communication device according to claim 9, comprising:
   a determining unit, configured to sample the packet to determine making statistics on the packet, wherein
   the statistical unit is further configured to make statistics on the packet to obtain a statistical value of the stream corresponding to the packet, if the determining unit determines to make statistics on the packet.

* * * * *